Patented Mar. 16, 1943

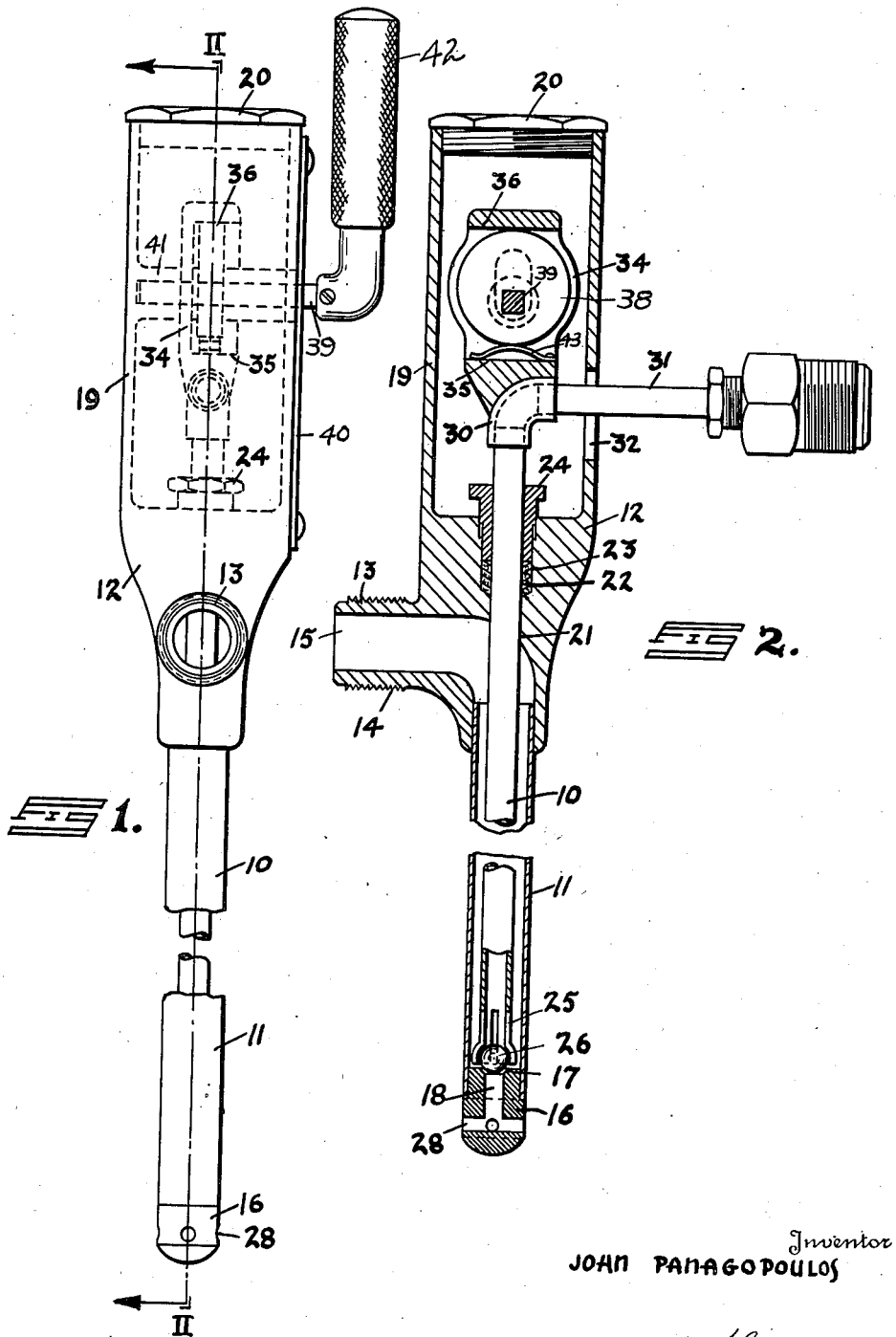

2,314,100

UNITED STATES PATENT OFFICE 2,314,100

APPARATUS FOR DISPENSING BEVERAGES

John Panagopoulos, Youngstown, Ohio

Application November 18, 1940, Serial No. 366,182

2 Claims. (Cl. 225—3)

This invention relates to apparatus for dispensing beverages and more particularly to improved features of construction of an assembly used in withdrawing beverages such as beer or the like from a barrel or other container which assembly is intended in its usual and normal use to replace the conventional draft tube heretofore employed for the purpose.

In the distribution of certain beverages, particularly beer, it is common practice to deliver the beverage to the retailer in barrels or other containers of substantial capacity and as the beverage must be maintained under pressure at all times a specially constructed mechanism is provided to tap the barrel or container and to thereafter withdraw the beverage therefrom. This includes a fitting positioned in an end of the barrel and having an aperture therethrough for the passage of the draft tube together with packing and a packing tightening nut to seal off the tube after it is inserted in the barrel or container. A cork is positioned in the aperture for shipment and when it is desired to tap the barrel or container the end of the tube is placed against the cork and the latter is forced into the container ahead of the end of the tube. After the tube is moved to proper position the packing nut is tightened and thereafter the beverage may be valved through the tube.

Once the draft tube is inserted in the container it cannot be withdrawn without spoiling the beverage remaining therein since there is no way to seal the aperture in the fitting positioned in the wall of the container. Consequently it is practical to clean the interior passage of the tube only when the contents of the container utilizing the tube has been emptied.

Special equipment, not ordinarily possessed by the individual tavern owner or beverage retailer, is required to satisfactorily clean and scour the coils and other conduits through which the beer or other beverages passes from the container to the customer's glass. Such coils and conduits must, for sanitation reasons, be cleaned and scoured once or twice each week and in practice this is accomplished by a skilled operator provided with special equipment who calls at periodic intervals at the tavern or other retail establishment. When such calls are made the draft tubes in the tapped barrels are not cleaned if any appreciable volume of beverage remains in the barrels and consequently such tubes, if they are to be cleaned at all, must be cleaned by the retailer himself. Experience has shown however, that the tavern keeper or other beverage retailer, has neither the initiative nor the equipment to properly treat these tubes to keep them in a sanitary condition.

Therefore the primary object of the invention is the provision of an improved construction for a beverage draft tube whereby the draft tube may be thoroughly cleaned and scoured while the same remains in tapped position in the beverage barrel or other container.

Another object of the invention is the provision of a draft tube having the characteristic pointed out above which tube may be cleaned without contaminating or losing any of the beverage remaining to the barrel in which the tube is situated.

A further object of the invention is the provision of a draft tube operative in the manner indicated above which may be coupled with the beverage supply line and/or beverage cooling coil and thereby thoroughly cleaned by a coupled scouring machine, such as shown in my prior United States Reissue Patent #21,692, for example.

These and other objects and advantages of the invention will become apparent from a consideration of the following detailed specification and the accompanying drawing wherein there is specifically disclosed a preferred embodiment of the invention.

In the drawing:

Figure 1 is a side view of a beverage draft tube constructed in accordance with the principles of the invention; and Figure 2 is a longitudinal sectional view taken along the line II—II of Figure 1.

The apparatus of the invention, in its preferred and illustrated embodiment, consists essentially of inner and outer tubes or conduits 10 and 11, respectively, and a valve for controlling communication between the space within the beverage barrel or container and the spaces within the tubes.

Outer tube 11 is threaded into or otherwise suitably secured to a housing 12, the latter being provided with an integral laterally extending boss 13 exteriorly threaded at 14 and having a bore 15 in communication with the space within the tube 11.

A fitting 16 is screw threaded into the lower end of the tube 11 and is provided with a shoulder to overlie the lower end of the tube. A valve seat 17 is provided on the inner end of fitting 16 and extending therefrom is a passage 18 which terminates short of the outer end of the fitting 16. A number of radially extending bores 28 provide communication between the passage 18 and the space surrounding the fitting 16.

Housing 12 has a cylindrical portion 19 closed at its top by means of detachable cap 20. Extending centrally of the housing 12 is a bore 21 having an enlarged section 22 to receive packing 23 and above this packing is a packing nut 24 having screw threaded engagement with the housing to vary the compression of the packing.

As shown in the drawing the inner tube 10 extends thru bore 21 and nut 24 and is concentrically disposed within outer tube 11. Tube 10 is slotted at 25 at its lower end and carries at its lower extremity a ball valve 26 adapted to co-operate with the valve seat 17 which is generally spherical. Ball 26 may be rigidly carried by the tube 10 but is preferably loosely socketed therein to facilitate the seating of the valve. It should be observed that when ball 26 is in engagement with valve seat 17 that all communication between the space surrounding members 11 and 16 and the spaces within either of the tubes 10 or 11 is sealed off.

An elbow 30 is attached to the upper end of tube 10 and a conduit 31 projects outwardly from the elbow thru a vertically extending slot 32 formed in the side wall of housing portion 19. Welded or otherwise suitably secured to member 30 is a fitting 34 having a lower horizontal surface 35 and an upper connected horizontal surface 36. Intermediate these surfaces is a cam 38 carried rigidly with a shaft 39 which passes through an aperture in a cover plate 40 and has its inner end journaled in a bore in a boss 41 formed inwardly of the side wall of the housing portion 19. An opening is provided in said side wall to permit assembly of the parts and this opening is closed by the plate 40. Cam 38 is now rotatable on the shaft 39 and it should be obvious that when shaft 39 is rotated the inner tube 10 will be moved axially of the outer tube 11. When in upper position valve 26 is unseated from the seat 17 either by fluid pressure if the ball is loosely mounted or by the inner tube of the ball is actually carried thereby and the beverage in the container may pass upwardly between the inner and outer tubes or through passages 25 and up through the inner tube. When the cam 38 is rotated from the position shown in the drawing the high point of the cam moves against spring 43 on surface 35 and moves valve 26 to closed position. Spring 43 provides high resilient pressure to maintain the valve closed and enables the handle 42 on shaft 39 to be moved to full down position to simplify operation of the device.

The apparatus described above is inserted in the container through the tap fitting in the same manner as is the conventional tap rod or tube. A cap or valve (not shown) closes off one of the conduits 15 or 31 and the other one is provided with a valve (not shown) and from this second valve extends a beverage line leading to the dispensing faucet. Handle 42 is moved to upper position thereby unseating valve 26 and beer or other beverage may now be drawn from the container. When it is desired to clean the apparatus, handle 42 is moved to lower position thereby closing valve 17—26 and the cleaning solution may be forced through passage 15, outer tube 11, slots 25, inner tube 10 and conduit 31, or vice versa, and upon completion of the cleaning operation and the clearing of the passages, the apparatus is again reconnected in the manner indicated above in condition for drawing beverage. The apparatus may be cleaned separately but is preferably coupled in series with the beverage cooling coil for this purpose.

The above specifically described embodiment of the invention should be considered as illustrative only as obviously many changes may be made therein without departing from the spirit or scope of the invention. For example, various other expedients may be resorted to to move the inner tube relative to the outer tube and to maintain the valve in closed position. Also the particular valve construction is not of the essence of the invention. The invention resides essentially in the provision of a double passaged draft tube for the ingress and egress of cleaning solution which passages extend substantially the entire length of the tube together with a positive valve for sealing off the passages from the space outside of the tube. It is contemplated that the fitting 16 be made easily removable so that it may be readily cleaned without the aid of special equipment if its condition requires that it be cleaned.

Having thus described my invention what I claim is:

1. A draft appliance for a beverage container comprising in combination a beverage drawing tube adapted to be inserted in said container through the draft tube fitting normally incorporated in a wall of said container, a pair of passages extending longitudinally through said tube substantially co-extensive therewith and interconnected at their lower ends whereby said passages are connected in series for the passage of a cleaning solution therethrough, a lower passage providing communication between the lower end of said pair of passages and the beverage in said container, a valve in control of said lower passage, and means extending through said tube to operate said valve, said means being operable from a position outside of said container.

2. A draft appliance for a beverage container comprising in combination a beverage drawing tube adapted to be inserted in said container through the draft tube fitting normally incorporated in a wall of said container, an inner tube within said first mentioned tube adapted to be moved axially of said first mentioned tube and extending substantially co-extensive therewith, a valve at the lower ends of said tubes to control the flow of beverage into said tubes and adapted to be opened and closed by said relative movement, and an aperture in the side wall of said inner tube adjacent the lower end thereof providing communication between the space within the inner tube and the space surrounding the inner tube but within the outer tube whereby a cleaning solution may be passed through said spaces in series upon the closing of said valve.

JOHN PANAGOPOULOS.